United States Patent [19]

Boer

[11] Patent Number: 4,800,809

[45] Date of Patent: Jan. 31, 1989

[54] EQUIPMENT FOR CONTINUOUSLY COAGULATING MILK PREFERABLY PRE-ACIDIFIED MILK FOR PREPARING YOGHURT

[75] Inventor: Jort Boer, Vorden, Netherlands

[73] Assignee: N. V. Machinefabriek Terlet, Zutphen, Netherlands

[21] Appl. No.: 41,438

[22] Filed: Apr. 23, 1987

[30] Foreign Application Priority Data

Apr. 23, 1986 [NL] Netherlands ............ 8601046

[51] Int. Cl.$^4$ .................................. A23C 9/12
[52] U.S. Cl. .......................... 99/453; 99/452; 99/478
[58] Field of Search ............ 99/452, 453–455, 99/456–456, 460, 483, 516, 467, 470, 477–479; 426/271, 491, 580, 582

[56] References Cited

U.S. PATENT DOCUMENTS

| | | | |
|---|---|---|---|
| 3,924,007 | 12/1975 | Driessen et al. | 426/43 |
| 4,108,057 | 8/1978 | Hain et al. | 99/452 |
| 4,321,861 | 3/1982 | Hain et al. | 99/455 |
| 4,603,623 | 8/1986 | Le Guen et al. | 99/452 |

FOREIGN PATENT DOCUMENTS

| | | |
|---|---|---|
| 1936804 | 2/1971 | Fed. Rep. of Germany . |
| 7204690 | 10/1973 | Netherlands . |
| 824176 | 11/1959 | United Kingdom . |
| 1081365 | 8/1967 | United Kingdom . |

OTHER PUBLICATIONS

J. Rasic et al., "Yoghurt", vol. 1, (1978), pp. 312–313.
Brinkman, "Technologie de la CAMATIC", Cahiers Alfa—Laval, No. 9, (1980), pp. 13–15.

*Primary Examiner*—Timothy F. Simone
*Attorney, Agent, or Firm*—Fleit, Jacobson, Cohn & Price

[57] ABSTRACT

Equipment for continuously coagulating preferably preacidified milk for preparing yoghurt, provided with means for keeping the milk at a desired temperature during coagulation, with means for feeding in the milk and with means for discharging the yoghurt, whereby the equipment consists of an essentially closed housing containing an endless conveyor belt on which containers of the paternoster-lift type are suspended, provided with means for advancing the conveyor belt at uniform velocity in the housing at a velocity such that each container remains for a desired time in the housing, and with means for stopping each container stepwise outside the housing during filling and during emptying.

8 Claims, 1 Drawing Sheet

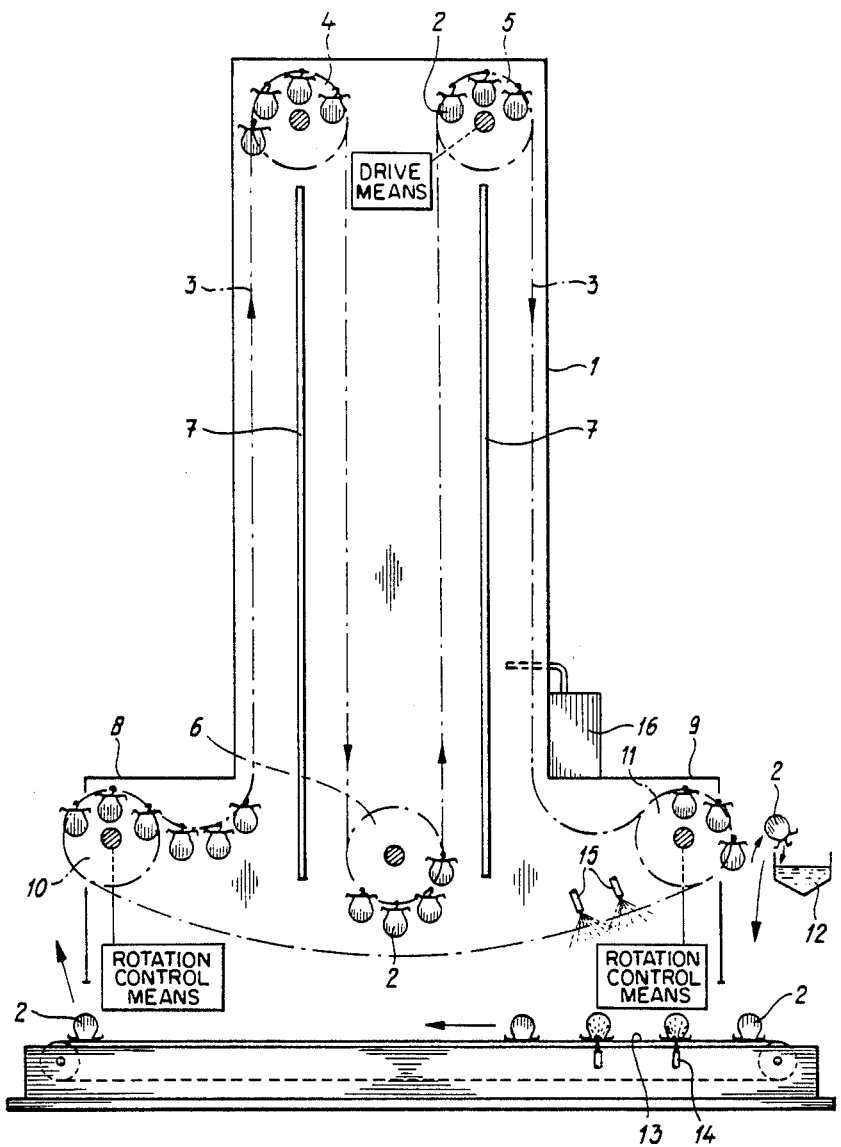

EQUIPMENT FOR CONTINUOUSLY COAGULATING MILK PREFERABLY PRE-ACIDIFIED MILK FOR PREPARING YOGHURT

The invention relates to equipment for continuously coagulating milk preferably pre-acidified milk for preparing yoghurt, provided with means for keeping the milk at the desired temperatures during coagulation, with means for feeding in the milk and with means for discharging the yoghurt.

Such equipment is described in Dutch patent application No. 7204690 and consists of a coagulating column with a large capacity. The preferably pre-acidified milk remains in said column for approximately 2½ hours. The liquid level is always kept the same.

The milk must be fed in very carefully because the milk particles must not have a relative velocity with respect to each other since otherwise preferred flows will be produced.

The milk is continuously fed in and the yoghurt is continuously discharged to cooling equipment. At the end of the coagulating process it is necessary to agitate with a horizontal agitating plate provided with openings which is moved vertically in the column.

The satisfactory operation of the said known coagulating column is therefore very critical.

The object of the invention is to provide equipment in which the preferably pre-acidified milk is coagulated in small quantities, but nevertheless continuously.

According to the invention this is achieved in that the equipment consists of an essentially closed housing containing an endless conveyor belt on which containers of the paternoster-lift type are suspended, provided with means for advancing the conveyor belt at uniform velocity in the housing at a velocity such that each container remains for a desired time in the housing, and with means for stopping each container stepwise outside the housing during filling and during emptying.

In this manner, the coagulation takes place in containers of limited capacity which are passed at uniform velocity through the coagulating space. The coagulation may require, for example, 1.5–2.5 hours.

The yoghurt remains at rest in each container, which promotes the coagulation process. The intended coagulating temperature is approximately 45° C.

BRIEF DESCRIPTION OF THE DRAWING

The invention will be explained in more detail by reference to the diagrammatic drawing.

DETAILED DESCRIPTION OF THE PREFERRED EMBODIMENT

The housing of the equipment according to the invention is constructed as a tower having an essentially rectangular cross-section. In the shown embodiment, there extend in said tower 1 four sections of a conveyor belt of the paternoster-lift type, i.e. containers 2 are rotatably suspended on chains 3 or the like, which sections are passed over two wheels 4 and 5 at the top of the tower 1 and one wheel 6 at the bottom of the tower 1. Partitions 7, which may be heated, may be placed between the ascending and descending sections.

At least one of the wheels 4, 5 or 6 may be driven.

Adjacent to both sides of the tower 1 are lower housing sections 8 and 9 containing wheels 10 and 11 respectively over which the conveyor belt 2, 3 is also passed.

The filling of the containers 2 with preferably preacidified milk takes place in the housing section 8, the coagulation of the milk in the tower 1 and the tilting and emptying of the containers 2 into a discharge trough 12 in the housing section 9. Instead of pre-acidified it is also possible to depart from normal milk to which a certain quantity of yoghurt cultures is added.

As it is evident from the drawing, the conveyor belt 2, 3 sags behind the wheel 10, in front of the wheel 11 and between the wheels 11 and 10. As a result of this it is possible to cause the conveyor belt 2,3 to move at a uniform velocity in the tower 1, but to cause the wheels 10 and 11 to move stepwise. This produces time for filling the containers 2 at the wheel 10 and removing the containers 2 from the chains 3 at the position of the wheel 11 in order to be able to empty the containers 2 into the discharge trough 12.

The coagulation of the milk in the container 2 which are situated in the tower 1 thus takes place continuously and at a uniform rate.

The coagulation time is determined by the residence time of each container 2 in the tower 1. Said time is determined by the drive velocity of the chains 3, but it is also possible for the route in the tower to comprise more than four sections, for example six sections as a result of adding an additional top wheel and an additional bottom wheel.

The wheels 10 and 11 can be stopped stepwise by conventional means.

The emptied containers 2 may be placed upside down on a horizontal conveyor belt 13 by means of which the containers 2 are returned to the wheel 10.

Over the first section of this horizontal path the containers 2 are rinsed clean by jets 14, then they drain out in order, finally, to be dried by hot air or the like.

At the left-hand end of the conveyor belt 13, the containers 2 are returned by means not shown and suspended on the chains 3.

The chains 3 are also rinsed clean by jets 15 between the wheels 11 and 10.

A certain temperature and a certain humidity must be maintained in the tower 1. This may be implemented by means known per se in processing technology which do not need to be described here in further detail. A suitable temperature is, for example, approximately 45° C.

An air feed and filtering equipment 16 is furthermore present which provides a reliable overpressure in the tower-like housing 1 blowing in filtered air with a higher than atmospheric pressure.

The conveyor belt 2, 3 can be passed through the tower 1 with a uniform velocity such that the residence time is 1.5–2.5 hours. The wheels 4, 5 and 6 thus rotate continuously.

The wheels 10 and 11 are stationary, for example, for ¾ of the residence time in order to make filling and emptying of the containers possible.

The containers 2 may have, for example, a capacity of 120 liters.

I claim:

1. Equipment for continuously coagulating milk for preparing yoghurt, said milk being maintained at a predetermined temperature during the continuous coagulation, said equipment comprising:

an essentially closed housing having at least one opening therein;
an endless conveyor belt disposed substantially within said housing, said conveyor belt having at least one minor portion thereof extending through said at least one opening in said housing;

a plurality of paternoster-lift type containers suspended from said conveyor belt;

means for advancing said conveyor belt at a uniform velocity within said housing such that each of said containers remains within said housing for a predetermined time; and means for stopping each container stepwise along said at least one minor portion of said conveyor belt to permit filling of each container with milk outside said housing and to permit emptying of coagulated milk from each container outside said housing;

wherein, said containers are filled with milk at a filling point outside said housing; the filled containers, which are suspended from the conveyor belt, are transported into the housing and remain within the housing for said predetermined time to permit coagulation of the milk in the filling containers; and then the coagulated milk is emptied out of the containers at an emptying point outside said housing.

2. Equipment according to claim 1 characterized in that the housing is constructed as a tower in which the containers are advanced along vertical paths.

3. Equipment according to claim 2, further comprising two reversing wheels disposed at the top of the tower and one reversing wheel disposed at the bottom of the tower for the conveyor belt, at least one of said reversing wheels being driven at a uniform velocity.

4. Equipment according to claim 2, characterized in that, near the bottom of the tower, there are disposed on both sides of the tower reversing wheels for the conveyor belt which can be stopped stepwise in order to enable filling or emptying of the paternoster-lift containers, it being possible for the conveyor belt to sag between said reversing wheels and between said reversing wheels and the upper reversing wheels in the tower.

5. Equipment according to claim 1, further comprising means for cleaning and drying the paternoster-lift type containers after emptying, said cleaning and drying means comprising a horizontal conveyor belt upon which the containers are placed upside down, said horizontal conveyor belt returning the containers to the filling point.

6. Equipment according to claim 1, further comprising means in the tower for keeping the humidity in the tower at a certain desired value.

7. Equipment according to claim 1, further comprising means for generating a slight overpressure in the tower.

8. Equipment according to claim 1, further comprising heatable partitions disposed between sections of the conveyor belt in the tower.

* * * * *